United States Patent Office 3,472,094
Patented Oct. 14, 1969

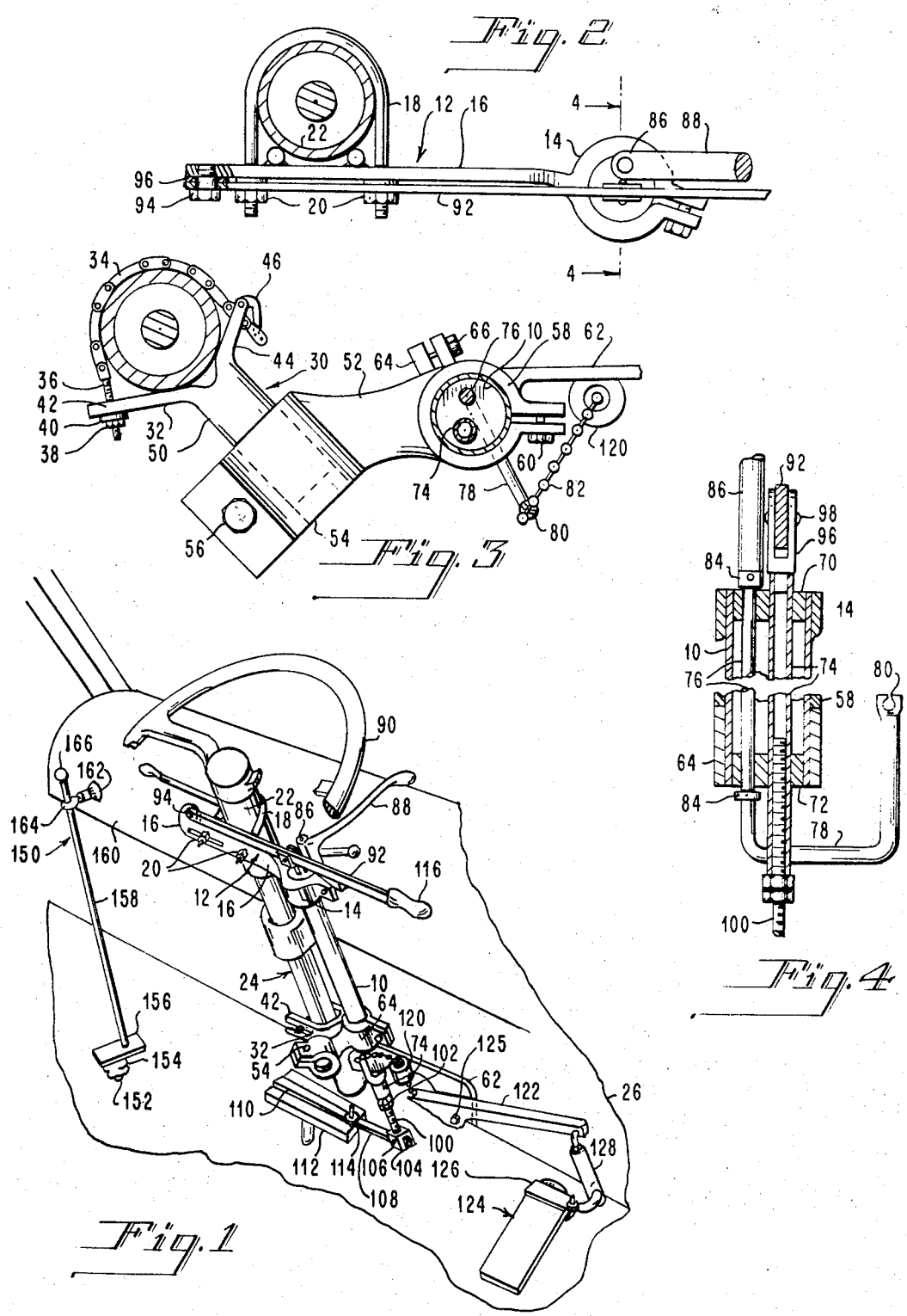

3,472,094
HAND CONTROL FOR MOTOR VEHICLES
Louise Lake, Palo Alto, Calif., and George H. Mortimer, Montclair, N.J., assignors to Louise Lake Enterprises, Inc., Mount Kisko, N.Y., a corporation of New York
Original application Apr. 1, 1965, Ser. No. 444,650, now Patent No. 3,373,628, dated Mar. 19, 1968. Divided and this application Mar. 6, 1968, Ser. No. 711,004
Int. Cl. G05g 1/04, 13/00
U.S. Cl. 74—481                                    8 Claims

ABSTRACT OF THE DISCLOSURE

A manual control for operating the brake pedal and accelerator pedal of a motor vehicle having a steering column and a steering wheel which includes means, e.g., a frame, removably mounted in said vehicle adjacent to the steering column providing two pivots. To one of them a brake lever is pivoted for up and down movement. It has a handle adjacent to and below the periphery of the steering wheel and a brake rod that is secured at one end to the brake lever and at the other end to the brake pedal. To the other of them an accelerator lever is pivoted for back and forth movement generally parallel to the under surface of the steering wheel. It has a handle adjacent to the periphery of the steering wheel and means connected to the lower end thereof to translate the back and forth movement of the handle end into up and down movement of the accelerator pedal.

Thi is a division of our patent application Ser. No. 444,650, filed Apr. 1, 1965, now Patent No. 3,373,628, granted Mar. 19, 1968, for Hand Control for Motor Vehicles.

DESCRIPTION

The present invention relates to a hand control for motor vehicles which is particularly adapted to meet the needs of handicapped persons who do not have the use of their lower limbs and thus cannot operate the conventional foot controls. Since the majority of the automobiles in use today have automatic gear shifts and therefore do not have a floor clutch pedal, the present invention provides means for operating by hand the brake pedal and the accelerator pedal and, if desired, the dimmer switch.

Hand controls have been the subject of many patents and some hand controls are available on the market. All of these prior devices suffer from one or more of the following disadvantages:

They require one hand of the operator to be taken from the steering wheel all the time the hand control is being used.

They are difficult and time consuming to install.

They are not applicable to a large number of different makes and models of automobiles.

The present invention overcomes these disadvantages. The structure and principle of the invention, the manner of using it and the best mode of carrying out the invention in a particular embodiment thereof will be described in conjunction with the drawing in which:

FIG. 1 is a perspective view of said particular embodiment which was disclosed in but cancelled from said parent application with means for removably securing it to the motor vehicle which is fragmentarily shown adjacent to and along the steering column, including a dimmer switch removably secured to the dash;

FIG. 2 is a partial plan view of the device of FIG. 1 with the steering column shown in section and some parts broken away to show structure;

FIG. 3 is a partial sectional view of the device of FIG. 1 taken just above the lower clamp; and FIG. 4 is a fragmentary vertical sectional view along the line 4—4 of FIG. 2.

The embodiment of the invention disclosed in the drawing comprises a frame 10, preferably in the form of a tube, between an upper clamp 12 having a collar grip 14 for the tube and a block 16 adapted to be secured by a U-bolt 18 and nuts 20 to the housing 22 of the steering column 24 of a motor vehicle 26. The lower clamp 30 includes a V-bar 32, a chain 34, a bolt 36, a nut and washer 38 and 40 to tighten the chain when inserted in the bifurcated end 42 of V-bar 32. In the other bifurcated end 44 of V-bar 32 of clamp 30 is a pivoted dog 46 which can be inserted into any link of the chain 34 that is slidable in the slot between the bifurcated ends to any desired position before dog 46 is engaged with the link and thus give great adjustability of the clamp to housings of varying diameter. The V-bar 32 is provided with a tubular extension 50 to be held in a dual collar grip 52 having one collar grip 54 and bolt 56 for the extension 50 of V-bar 32 and a second collar grip 58 and bolt 60 for the tube 10. Also secured to tube 10 is a fulcrum support bar 62 having a collar grip 64 and bolt 66 for a purpose to be described hereinafter. The parts just described provide the frame for the hand control and means for removably securing the frame to the motor vehicle adjacent to and along the steering column.

The tube 10 is provided with upper and lower sleeve bearings 70 and 72 for a brake rod 74, preferably in the form of a tube, and an accelerator rod 76. The brake rod 74 is slidably mounted for up and down movement in the bearings while rod 76 has oscillating movement in its bearings. Thus the bearings for rod 74 and rod 76 constitute a pivotal mounting for parts connected with the rod 76. Connected to the lower end of rod 76 is an arm 78 which extends outwardly and then upwardly and has its end flattened and slotted at 80 to provide a connection for a ball chain 82 later to be described. Collars 84 are provided on rod 76 to hold it in any desired position of vertical adjustment respective to the frame 10. An accelerator lever 86 is removably but non-rotatably mounted on the upper end of rod 76 which is adapted to move generally parallel and adjacent to the under surface of steering wheel 90. A handle 88 on the end of lever 86 extends far enough beyond the wheel so that the fingers of a driver's hand can engage and move it back and forth while the palm rests on the upper surface of the wheel.

In addition to the pivot for the accelerator lever 86 the means heretofore described provides a second pivot for a brake lever 92 by means of a shoulder bolt 94 screwed into block 16 with an interposed washer 96, as seen in FIG. 2. The hole in lever 92 for the shoulder bolt is preferably an elongated slot to take care of the arcuate movement of the lever and still provide straight line movement of a clevice 96 secured to the upper end of the brake rod 74 by any suitable means and to the lever 92 by the pivot pin 98. Slidably mounted in the lower end of tubular brake rod 74 is a threaded bar 100 having lock nuts 102 screwed thereon to make adjustable lost motion contact with the end of rod 74. At the lower end of bar 100 is a clevice 104 pivoted by pin 106 to pivot arm 108 of a hook plate 110 adapted to be secured to brake 112 by J-bolt 114, as seen in FIG. 1. A handle 116 is secured to the end of lever 92 remote from the pivot point at bolt 94 and it will be clear that movement of the handle downwardly will apply the brake whereas the brake operating parts will freely rise when downward pressure is released by the normal spring action of the brake pedal 112. The lost motion connection between rod 74 and bar 100 permit the handle 116 to be raised higher than the brake pedal 112 would allow if rod 74 were directly connected to the pedal 112 and bar 100 is long enough to remain far enough in tube 74 at the highest position of handle 116 to prevent disengagement or canting.

Means to translate the back and forth movement of the accelerator lever 86 and rod 76 about the axis of the latter into up and down movement may comprise the ball chain 82 mentioned above which operates through a guide bearing or tube 120, preferably of a suitable plastic or prelubricated sintered metal, which is mounted on fulcrum support bar 62. Fulcrumed on bar 62 is a lever 122 which extends transversely over or adjacent to the accelerator pedal 124 on which a hook clamp 126 is removably secured and a linkage 128 pivotally connects the end of the lever 122 at one side of the fulcrum 125 to the clamp 126 while the other end of the lever is slotted to receive the other end of the ball chain 82, as seen in FIG. 1. In the operation of the device of FIG. 1 it will be apparent that the hand of the driver or operator may rest always on the steering wheel during operation of the accelerator control lever 84 which, when moved downwardly, i.e., toward the operator, swings arm 78 in the same direction causing the ball chain 82 to pull the adjacent end of lever 122 upwardly, thereby depressing the other end thereof and through linkage 128 and clamp 126 also depressing the accelerator pedal 124. When downward pressure on handle 86 is released the normal spring action of the accelerator pedal brings all parts back to neutral position. If it is desired to operate the accelerator pedal by movement of the lever 86 away from instead of toward the operator it is merely necessary to locate the arm 78 on the other side of support bar 62 and suitably position handle 88 on the rod 76. When the operator wishes to apply the brake, the accelerator lever 86 is released and the operator's hand is dropped from the steering wheel to the handle 116 to which downward pressure is then applied to depress the brake pedal. This form of manual control is useful not only for handicapped people but also for truck drivers, automobile drivers, and others who have long trips to make when a change from foot controls to hand controls relieves tension resulting from sitting in the one position required for foot control. This embodiment of the hand control may provide very powerful braking force on the brake pedal by utilizing the large mechanical advantage which can readily be built into this design. It can also be designed for left hand operation of either the brake lever 92, or the accelerator lever 86, or both, in the case of the brake lever by reversing its direction and providing an extension on block 16 at the right to receive the shoulder bolt 94 a proper distance from clevice 96, and in the case of the accelerator lever 86 by looping it around the steering column on a radius sufficient to place handle 88 in the desired position and permit sufficient movement to the lever to operate the accelerator pedal 124 as described.

FIG. 1 also discloses a desirable type of dimmer switch control 150 which is removably attached to the usual dimmer switch 152 by a socket 154, e.g., a rubber cup, which is secured to one end of a short bar 156 to the other end of which a push rod 158 is fastened. The upper end of the rod 158 is removably held to the dash 160 by any suitable device such as a vacuum cup 162 and ring 164 through which the rod may reciprocate. A handle 166 may be secured to the upper end of rod 158. It will be apparent that the offset provided by bar 156 makes it possible for the dimmer switch 152 to be operated by foot pressure on the bar 156 or by hand pressure on the handle 166.

Although this embodiment of the invention has been described and illustrated in connection with certain specific structure, those skilled in the art will recognize that modifications and variations can be made without departing from the spirit and scope of the invention.

Having thus described and illustrated the invention, what is claimed is:

1. A manual control for operating the brake pedal and accelerator pedal of a motor vehicle having a steering column and a steering wheel comprising means removably secured to said vehicle adjacent to said steering column providing a first pivot having an axis at right angle to a plane through the axis of said steering column and a second pivot having an axis parallel and adjacent to the axis of said steering column, a brake lever pivoted to said first pivot for up and down movement and having a handle adjacent to the periphery of said steering wheel, a brake rod operatively secured to said brake lever and to said brake pedal for actuating the brake when the handle of said brake lever is moved down, an accelerator lever pivoted to said second pivot and extending to a position adjacent to the periphery of said steering wheel for back and forth movement generally parallel to the under surface the periphery thereof, and means to translate the back and forth movement of said accelerator lever into up and down movement of said accelerator pedal.

2. A manual control as set forth in claim 1 in which said means removably secured to said vehicle includes a frame providing a third pivot and said means to translate said back and forth movement into up and down movement of the accelerator pedal includes a lower accelerator lever on said third pivot.

3. A manual control as set forth the claim 2 in which said frame includes a tube, an upper and a lower securing means for holding the tube adjacent to and along the steering column.

4. A manual control for operating the brake pedal and accelerator pedal of a motor vehicle having a steering column and a steering wheel comprising support means for two pivots, means for removably securing said support means to said vehicle adjacent to said steering column below said steering wheel, brake operating means including a lever secured to one of said pivots for up and down movement and a brake rod for directly transmitting downward movement of said brake lever to said brake pedal for actuating the brake, accelerator operating means including a lever pivoted to the other of said pivots for back and forth movement generally parallel to the under surface of said steering wheel and means to translate the back or forth movement of said accelerator lever into down movement of said accelerator pedal, said support means comprising a frame including a tube through which the brake rod and part of the means to translate the back and forth movement of the accelerator lever pass.

5. A manual control as set forth in claim 4 in which said brake operating means includes also a lost motion connection of the brake rod to the brake pedal on the up motion of the brake lever.

6. A manual control for operating the brake pedal and the accelerator pedal of a motor vehicle having a steering column and wheel comprising:
 (a) a frame adapted to be removably secured to said vehicle adjacent to and along the steering column, said frame including:
  (1) an upper securing means,
  (2) a lower securing means and
  (3) means extending between said upper and lower securing means to hold them in spaced relation to each other, and
 (b) brake and accelerator control means including:
  (1) a brake lever fulcrum and an accelerator lever fulcrum on said frame, said brake lever fulcrum having an axis at right angles to a plane through the axis of the steering column and said accelerator lever fulcrum having an axis parallel and adjacent to the axis of said steering column when said frame is secured as aforesaid,
  (2) a brake lever pivoted on said brake lever fulcrum and an accelerator lever pivoted on said accelerator lever fulcrum, (3) a brake linkage for operatively connecting the brake lever to the brake pedal for direct application of a push on the brake lever to downward movement of the brake pedal, and (4) an accelerator linkage for operatively connecting the accelerator lever with the accelerator pedal to apply a downward force on said accelerator pedal when the accelerator lever is moved in a plane at right angles to the plane of movement of the brake lever.

7. A manual control as set forth in claim 6 in which the accelerator linkage includes a lower accelerator lever pivoted to said frame for up and down movement.

8. A manual control as set forth in claim 6 in which both linkages have lost motion connection to their respective pedals and the said connection to the accelerator pedal includes a ball chain.

References Cited

UNITED STATES PATENTS

| | | | |
|---|---|---|---|
| 2,724,285 | 11/1955 | Lerman | 74—481 |
| 2,826,089 | 3/1958 | Hammack | 74—481 X |
| 2,899,835 | 8/1959 | Moreland | 74—481 |
| 2,949,044 | 8/1960 | Hughes | 74—481 |
| 2,953,036 | 9/1960 | Wendt | 74—481 X |

MILTON KAUFMAN, Primary Examiner

Dedication 3,472,094.—*Louise Lake*, Palo Alto, Calif. and *George H. Mortimer*, Montclair, N.J. HAND CONTROL FOR MOTOR VEHICLES. Patent dated Oct. 14, 1969. Dedication filed July 28, 1980, by the assignee, *Louise Lake Enterprises, Inc.*

Hereby dedicates to the Public the entire term of said patent.

[*Official Gazette October 28, 1980.*]